Jan. 18, 1955  A. W. VINCENT  2,700,070
INTERCOMMUNICATION SYSTEM
Filed Jan. 27, 1951  6 Sheets-Sheet 1

INVENTOR.
ANDREW W. VINCENT
BY
D. Clyde Jones
ATTORNEY

Fig. 3

Jan. 18, 1955 A. W. VINCENT 2,700,070
INTERCOMMUNICATION SYSTEM
Filed Jan. 27, 1951 6 Sheets-Sheet 5

INVENTOR.
ANDREW W. VINCENT
BY
D. Clyde Jones
ATTORNEY

United States Patent Office 2,700,070
Patented Jan. 18, 1955

2,700,070

INTERCOMMUNICATING SYSTEM

Andrew W. Vincent, Rochester, N. Y.

Application January 27, 1951, Serial No. 208,168

5 Claims. (Cl. 179—18)

This invention relates to an intercommunicating system using automatic switches.

In conventional intercommunicating systems without manual operators, intercommunication is effected either by automatic switches selectively operated from dial impulses transmitted from the originating stations, or in the case of smaller systems push buttons are provided at each station in the intercommunicating system to effect the desired connections. While the dial-operated type of system is especially satisfactory where a large number of telephone lines are served, it does not afford the simplicity of operation that is desirable where a small group of telephone stations are to be served, such as in intra-office communication. On the other hand, the conventional type of push button controlled intercommunication system, requires a relatively large cable extending to each desk or station of the system, since all of the lines of the system must appear at each station. Consequently if it is desired to move a desk to another part of the room, it is necessary to change the length of the cable extending to such station. Furthermore, the relatively long lengths of wire required in the cabling, renders such a system, expensive.

While a dial-operated telephone system affords the desired flexibility, it sacrifices the simplicity of operation wherein a single push button or key serves to connect an originating station with a desired station. On the other hand, the conventional type of push-button-operated intercommunicating system requires such an elaborate cabling arrangement and is so expensive that it too, does not satisfy all requirements.

The present invention has for its purpose an intercommunicating telephone system for a limited number of lines, such as eight, which preserves the flexibility of operation of a dial-operated telephone system and yet enables a calling station merely by the operation of a single selection key, to place the station in telephone communication with the wanted station, without the usual elaborate and expensive cabling.

For a clearer understanding of the invention reference is made to the drawings in which Figs. 1 through 5, when Figs. 1, 2 and 3 are arranged side by side in the order named and when Fig. 4 is placed below Fig. 2, and when

Fig. 6 is a simplified diagram of the finder start circuit utilized in this system;

Fig. 9 is a simplified diagram of the finder stop circuit;

Figs. 10 and 10a; Figs. 11 and 11a; Figs. 12 and 12a; Figs. 13 and 13a; Figs. 14 and 14a; Figs. 15 and 15a.

At each station in a system arranged to serve eight subscribers, there is provided, a transducer or loud speaking telephone LS of the moving coil type which functions both as a transmitter and as a loud speaking receiver. There are also provided at each station four selecting keys 10, 11, 12, and 13 of the rocking type, each of which is spring-returned to an intermediate normal position but which can be moved to an alternate position at each side of normal. In addition, there are provided at each station two selenium rectifiers R1 and R2 and a pulse transformer PT which cooperate in determining a selecting pulse individual to each station of the system. Further, each station is provided with a talk-listen rocking key 14 of the three-position type, having a normal position, a listening position and a release position.

Common equipment for the use of all of the eight stations, comprises a station finding circuit as well as a station connector circuit, the latter utilizing two rectifiers R3 and R4 and a related inductor 16 to break down the sixty cycle power supply voltage into eight voltage pulses each having a certain phase and polarity relation to the sixty cycle current of the power supply. In addition, there are also provided a finder stepping switch and a connector stepping switch, each of the well-known step-by-step type, which advances its brushes or wipers from terminal to terminal by means of a self-interrupting stepping magnet. In addition, there is also provided for the common use of all of the stations an amplifier which may be of the electronic type although any type of amplifier will be suitable.

In the making of a call from a given station in the present system the proper station selecting key individual to the desired station is operated until a tone is heard in the loud speaker at the given or calling station. The selecting key is then released and the system is ready to carry the conversation to the wanted station. The absence of the tone after a selecting key is operated, indicates that the system is in use and the second calling party must wait until the common equipment is available. The operation of the "talk-listen" key 14 at the calling station reverses the connection at the amplifier so that the called station can reply. The talk-listen switching controlled by the key 14, is normally effected at the calling station, but the common circuit equipment can be arranged at the amplifier so that the talk-listen switching can be effected at the called station whenever this type of operation is desired.

The common circuit equipment along with the mentioned switches, is released at the termination of the call, for the use of other stations, merely by operating the talk-listen key 14 at the calling station to its release position. In the present arrangement the connection is also released automatically if the talk-listen key is not operated for a predetermined interval of time during the course of the conversation. However, when the system is in use by two stations, the operation of the selecting key at a third station has no effect on the system but if this last-mentioned station selecting key is held in its operated position by the third party desiring to make a call, the finder switch selects this station as the first of such waiting stations, on the release of the system. The completion of the second call is indicated as before by a tone.

It will be noted that the system of the present invention differs from conventional telephone switching systems in that the basic connector circuit functions immediately and without further direction following the termination of the operation of the line finder, after it has located the calling station. Both operations of finding the calling station and the connection of that station to a wanted station are effected by the single operation of a station selecting key. This is in contrast to the operation of the conventional automatic telephone system wherein two separate operations by the subscriber are necessary. First, the telephone handset must be removed from its switch-hook or cradle, to initiate the finding of the calling line. Then, when a dial tone is heard, the subscriber must operate a dial impulse sender which transmits impulses to control a connector switch so that it seizes the called line or station. This procedure while acceptable in the case of a telephone system having a large number of telephone lines, does not provide the simplicity of an intercommunication system wherein the operations necessary to make a call are preferably reduced to a minimum. In other words, the present system with its limited number of stations can effect intercommunication with a high degree of promptness that is not possible with the usual dial-operated telephone system.

The sequential operation of both the finder and connector switches as a result of the operation of a single station selecting key, introduces special circuit requirements upon the station connecting circuit as well as on the station finding circuit, since there are five separate functions which must occur in a given sequence during the time that the station selecting key is operated. These functions are as follows: first, the finder switch must be started. Second, the finder switch must be stopped as soon as it finds the calling line and in addition must start the connector switch to hunt for the called station. Third, the connector switch must be stopped on the called station as soon as it is found by that switch. Fourth, a tone must be sent back to the calling station to indicate that the connection to the called station is completed. Fifth, provision must be made to operate the change-over relay of the system and thereby complete the intercommunication between the two stations as soon as the selecting key is released. The completion of a given circuit through a calling station is determined by the station selection function, the other four functions are effected in the common equipment to operate as indicated by the station circuit.

It is believed that the operation of the present system will best be understood by describing the several operations of interconnecting a calling station to a called station, followed by communication over the established connection and then releasing the connection so that the common equipment will be available to any of the other stations.

Figure 7:
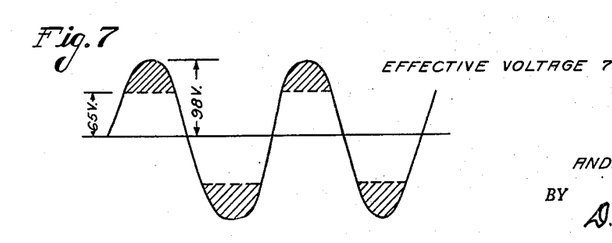
Figs. 7 and 8 are charts useful in explaining the operation of the finer start circuit.

When the party at one of the stations desires to originate a call, he moves one of the four selecting keys, for example key 10, to either one of the alternate positions thereof corresponding to the called line or station. The operation of any given selecting key at the calling station, renders the finder start circuit effective to connect the common equipment to this calling station. The finder start circuit consists of eight glow tubes, 21, 22, 23, 24, 25, 26, 27 and 28, a 70-volt secondary winding 29 of a power transformer, a vacuum tube bridge circuit B and the finder start relay 30. It will be noted that 70 volt 60 cycle alternating current is continuously impressed upon each of the primary station wires P through the respective glow lamps 21 to 28 and since this voltage is sufficient to "break down" the glow lamps, a common connection is thus established to all of the eight stations. These glow lamps break down at about 65 volts which means that 65 volts are consumed by each lamp at all times. The peak A. C. voltage in each circuit is 70×1.41=98 volts which leaves a top portion of each sine wave to appear elsewhere in the circuit as shown by the shaded area of the peaks of the sine wave graph in Fig. 7. When the station selecting key is operated, the completion of a given start circuit is effected by the connection of the primary wire to the common wire C through one of the station rectifiers R1 or R2 and to one or the other portion of the split winding of the pulse transformer PT. This completed circuit is traceable from ground through the load capacitor 32 conductor 33 thence through the 70 volt secondary winding 29 of the power transformer, conductor 34 switch terminal, through the finder switch terminal 35, thence through the wiper 36 of the finder switch, conductor 37, armature and back contact of the finder cut through relay 38, conductor 39, through the glow lamp 21, conductors 40 and 41, the operated station selecting key 10, in its dotted line position, rectifier R1 thence through the upper half of the winding pulse transformer PT, ground conductor C, to ground. The completion of the circuit just described, is effective to cause a rectified current to flow in this circuit thus charging the capacitor 32 associated with the grids of the triodes 43 and 44, in the bridge circuit. This change in voltage at the grid of the triode, which is positive, because of the operation of a particular station key 10, disturbs the balance of the bridge circuit B, which energizes the finder start relay 30 causing the finder switch to start its stepping operation. It will be understood that the pulses at the respective grids of the triodes in the bridge circuit B, may be positive or negative depending upon the station selecting key that is operated. It will be understood that both positive and negative voltages are effective to unbalance the bridge circuit to operate the finder start 30 relay in the manner mentioned.

As soon as the finder start relay operates, the finder switch steps from its normal or home position as shown in an initial stepping circuit which may be traced from ground at upper armature and back contact of the finder cut-through relay 38, thence through the self-interrupting contacts and winding of the stepping magnet 46, conductor 47, front contact and armature of the finder start relay 30, back contact and armature of the finder stop relay 48, conductor 49, resistor 50, through the selenium rectifier 51, to the fifty volt terminal of the secondary winding of the power transformer. Under the control of this circuit, the finder switch steps its brushes until the terminals of the calling line are found. At this time, the finder stop relay 48 is energized to interrupt the last-mentioned stepping circuit of the finder switch. The finder stop relay is energized in a circuit traceable from ground, the secondary winding of the power transformer, conductors 54 and 55, winding of the finder stop relay 48, conductor 56, back contact and armature of the finder cut-through relay 38, wiper 53 of the finder switch, now in engagement with the terminal 57 of the calling line P, conductor 41 thereof, through the operated station selecting key 10, rectifier R1, through the upper half of the winding of the pulse transformer PT, C conductor, to ground. The finder stop relay 48 when operated interrupts the stepping circuit of the finder switch, the circuit being interrupted at the armature and back contact of the finder stop relay.

Figure 8:
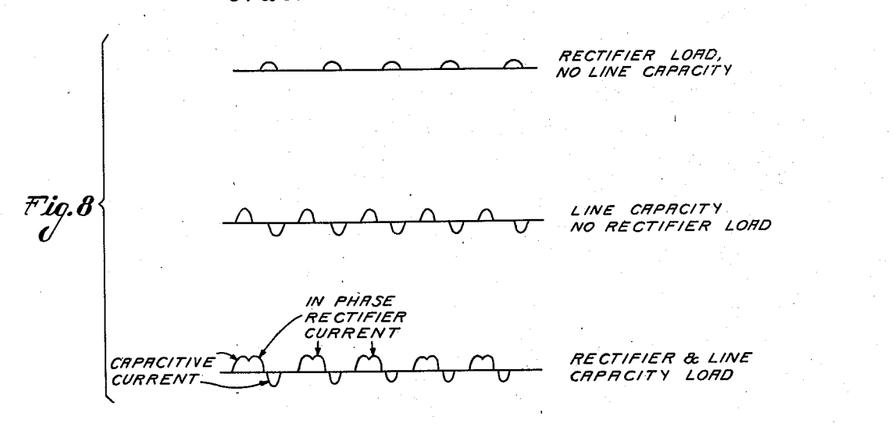

Before proceeding with the description of operating the connector switch, it should be pointed out that with the station selecting keys all in their normal or unoperated position, the loud-speaker LS is connected across the balanced pair of line conductors P and S, with no connection to the common ground conductor C. The capacity between the three wires P, S and C for twenty-five hundred feet of outside twisted telephone wire is approximately .025 mfd. Since the loud-speaker is across the balanced pair of conductors P and S these conductors are effectively short-circuited insofar as being a load upon the finder start circuit is concerned, which means that the maximum capacitance load to ground on each of the glow lamps is .05 mfd. When no call is being originated this capacitive load causes a capacitive current to flow, thereby lighting each of the glow lamps 21 to 28 somewhat in proportion to the length of its related line. This capacitive current is carried mainly by the load capacitor 32 in the grid circuit of the vacuum tubes 43 and 44 in the bridge circuit and the reactance of this capacitor must be sufficiently low to maintain the voltage at each of the glow lamps up to the break-down voltage thereof, since below this voltage some stations would not be able to originate a call. The several resistors such as 59 respectively in series with the glow lamps, tend to prevent any one circuit from drawing too much current. Since the capacitive current is equal on both the positive and negative half cycle, the RC timing circuit including the resistor R, and the capacitor CA, does not have time to charge sufficiently in either direction and, therefore, the balance of the bridge circuit B is maintained. Even though this relatively large capacitive current which is equal to the sum of the current in each of the lines, is flowing through the load capacitor 32, the circuit is not overloaded. When, however, the party at a calling station operates the station selecting key of a wanted station, the rectifier load at the calling line is shunted at this calling line with the result that the finder start relay 30 is operated. This takes place because the capacitive current leads the voltage as shown in the lower graph of Fig. 8, while the current through the rectifier R1 is in phase with this voltage. In other words, the relatively small rectified component of the current is not superimposed on top of the capacitive current and is, therefore, not masked by it. As a result of this arrangement the circuit has the advantage that line leakage resistance or even a direct short circuit across the line will not start the finder switch into operation.

The finder stop circuit consists of a sensitive relay 48 in series with twenty-four volt A. C. and with the wiper 53 of the finder switch. The wiper 53 hunts over the P station wires of the several stations until it connects with the rectifier load R1 of the calling station which operates the finder stop relay 48 and stops the finder switch on the calling line. It should be mentioned that the finder stop relay 48 must have a low enough resistance so that it is operated by a single half cycle of rectified current but will not operate through the several line capacitances, as the P wiper 53 hunts over the lines. The finder switch stepping speed determines the length of time which the wiper 53 remains on each line terminal and the number of half wave pulses passing through the finder stop relay 48. At thirty pulses per second, the relay 48 will always receive a full half wave pulse regardless of the relative phase of the switch that of the 60 cycle current of the power source. The finder stop relay 48 when energized operates a finder cut-through relay 38 in a circuit from ground, winding of this relay, armature and front contact of relay 48, conductor 49, resistor 50, rectifiers 51, the fifty volt secondary winding of the power transformer, to ground. Relay 38 on operation, locks up through its own contact and upper armature, to interrupt the operation of the finder switch and to disconnect the finder stop relay 48 as well as the finder switch from further operation. The operation of the finder cut-through relay 38 starts the connector switch into operation and transfers the P and S wiper circuits from the finder circuit to the station selector or connector circuit. This cut-through relay 38 also supplies the voltage to the connector stop relay 60 and to the release circuit as well. On the operation of the cut-through relay as mentioned, the connector switch advances its brushes 61, 62, 63 and 64 in search of the terminals of the wanted station STA 8 which terminals are determined by a particular code impulse.

At this time it should be explained how the several identifying code impulses for the respective stations are generated. The present arrangement for generating these code impulses to effect circuit selection, utilizes an inductance and a selenium rectifier to break down the 60 cycle power supply voltage into eight different voltage pulses, each having a certain phase and polarity relation to the original 60 cycle sine wave.

Figures 9, 10, 10A:
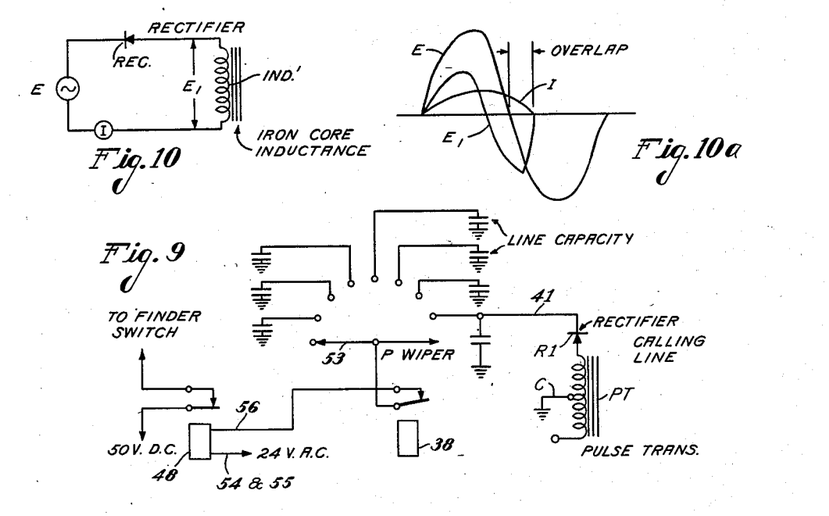
Figures 12, 12A, 14, 15, 16:
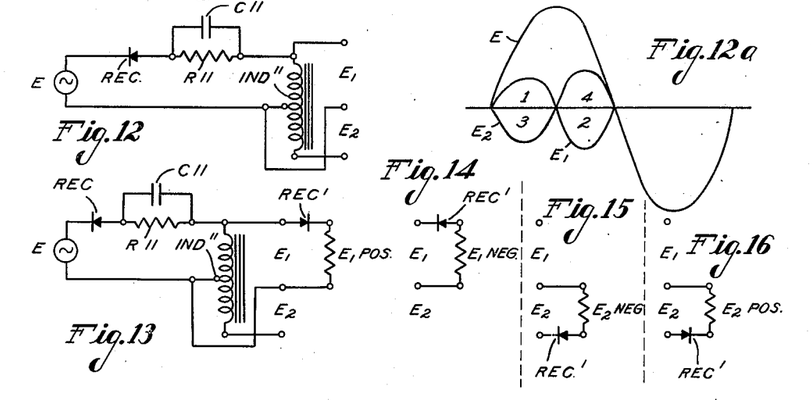
Figure 13A:
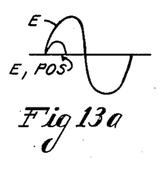
Figure 14A:
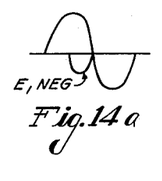
Figure 15A:
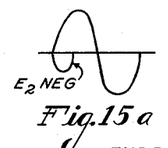
Figure 16A:
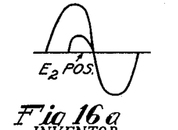
Fig. 16 are respectively circuit networks and charts useful in describing the operation of the pulse selection circuit.

As shown in Fig. 10, if an alternating voltage E is fed into an iron core inductance IND' through a half wave rectifier REC, a current I will flow and the voltage E1 produced across the inductance is a distorted sine wave, as illustrated in Fig. 10a. As a result of the effect of the inductance in the closed circuit network of Fig. 10, the current I and the voltage E1 are partly carried over into the next half cycle. This overlap of current and voltage can be adjusted so that it occupies all or any part of the first half cycle, by inserting a parallel resistor R11 and capacitor C11 in series with the above circuit in the manner shown in Fig. 11. When current flows in the circuit of Fig. 11, the voltage charge built-up across the capacitor C11 cancels the voltage of the inductance IND and causes the voltage across the rectifier REC to reverse sooner, thereby reducing the duration of the current in relation to the applied voltage E. The resistor R11 discharges the capacitor C11 before the start of the next half cycle of current. If now, a center-tapped inductor IND" is used (Fig. 12), it is possible to reverse the phase of the voltage E1 and thereby produce a voltage E2 as shown in the diagram of Fig. 12a. If a secondary rectifier REC' (Figs. 13, 14, 15 and 16) is added, it is possible to segregate any one of the four half cycles of voltages E1 and E2 as illustrated in Figs. 13a, 14a, 15a and 16a. By reversing the polarity of the primary circuit rectifier, current flows during the negative half of the cycle and in the same manner as described above, four more pulses can be generated during the last half cycle of the applied voltage E.

In the preferred form of the invention diagrammatically illustrated in Figs. 1 to 5, each line comprises a P conductor, an S conductor and a common ground conductor C. The third wire or common ground conductor of this preferred arrangement, is also used for control purposes in the talk-listen circuit and the release circuit of the preferred embodiment.

Figures 1, 6:
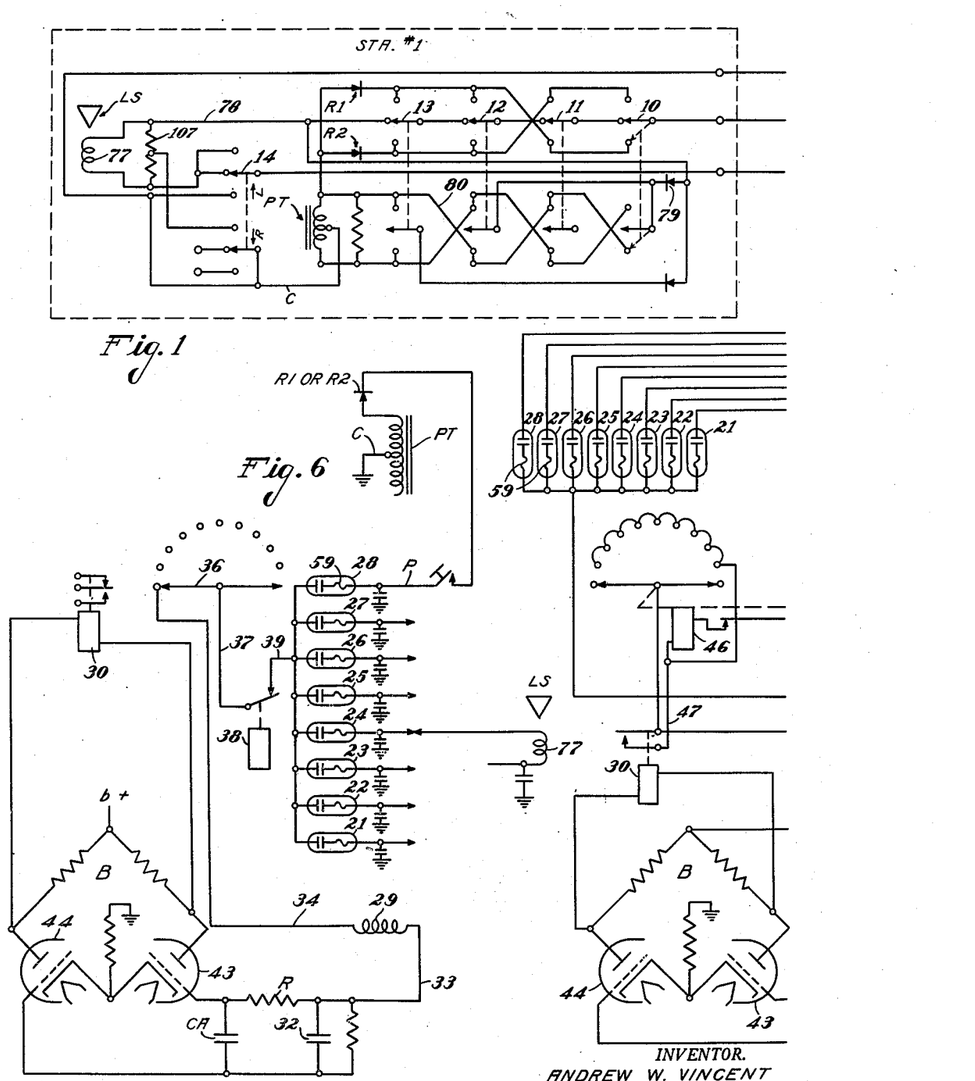
Figure 2:
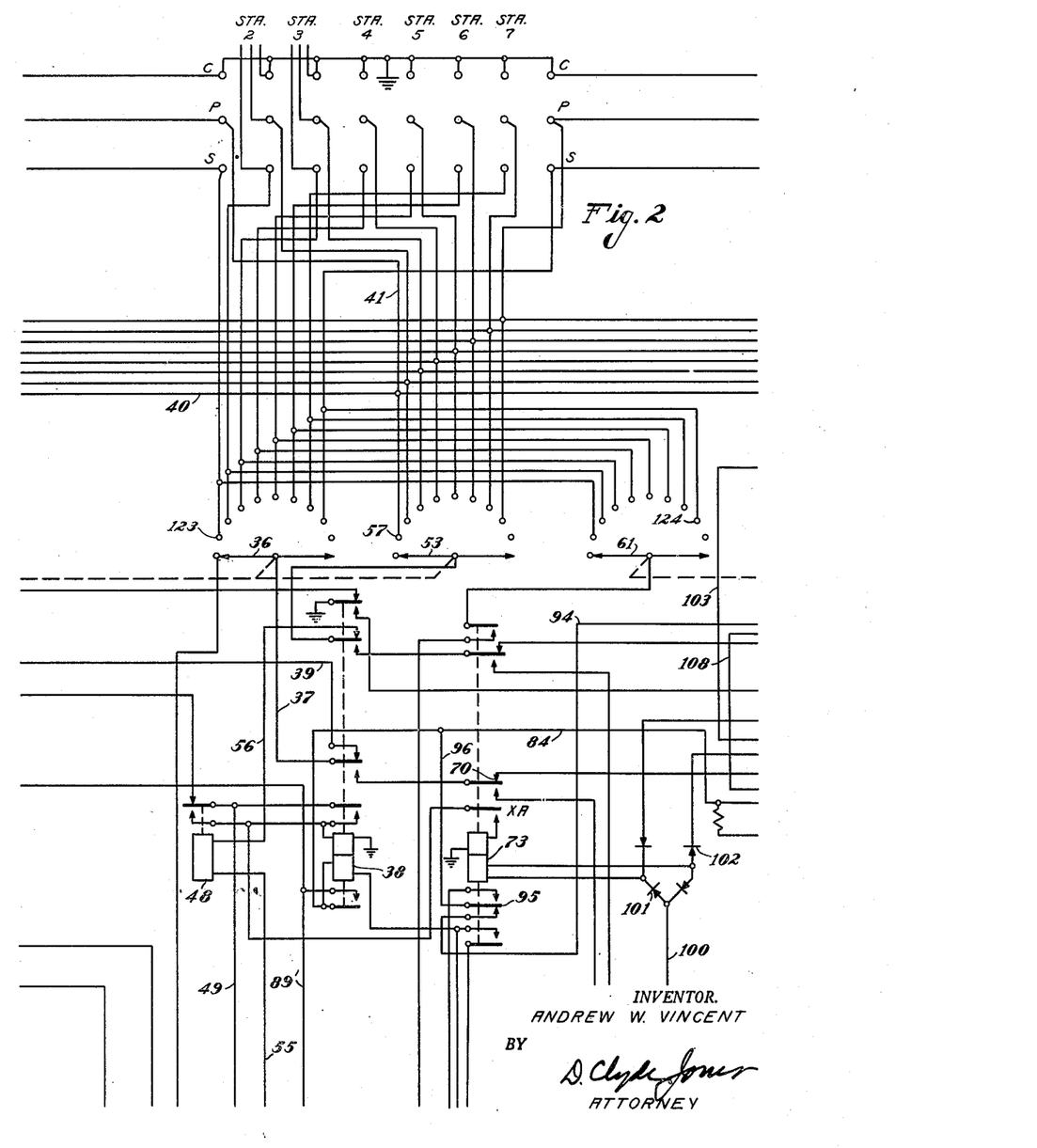
Figure 3:
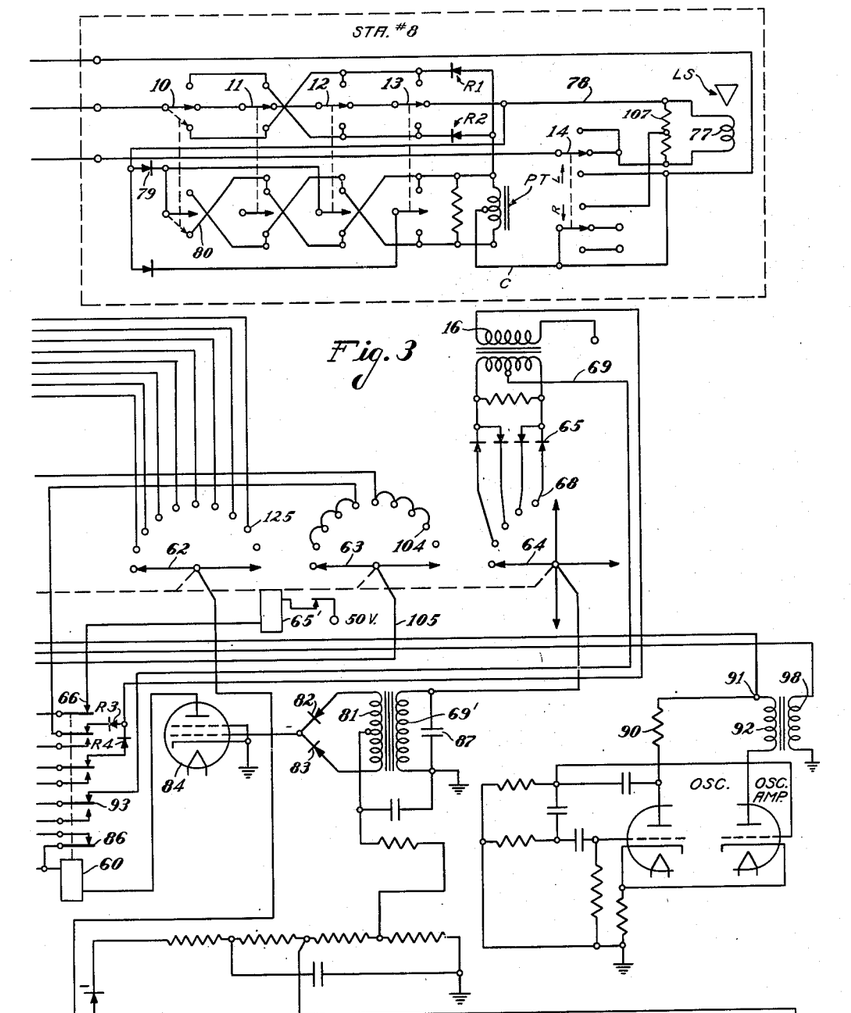
Figures 4, 11, 11A:
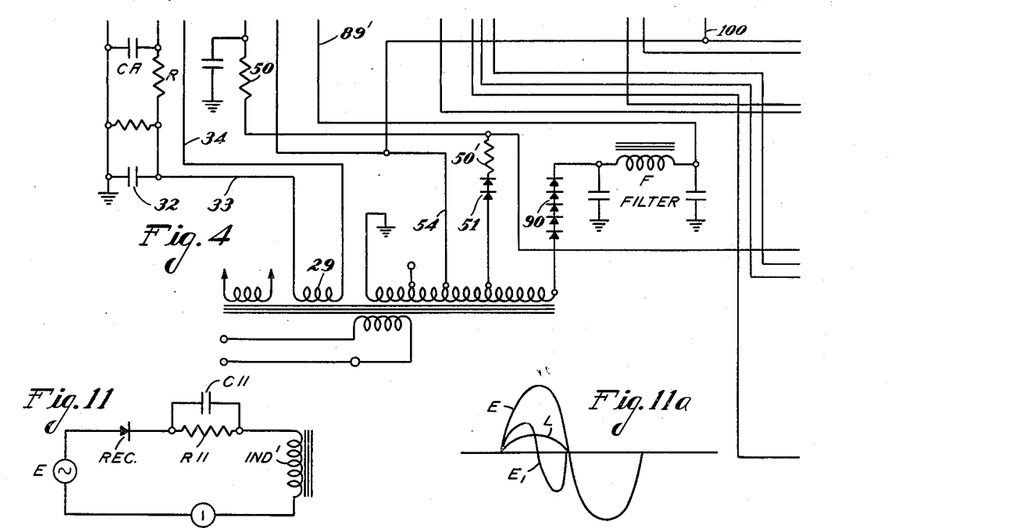
Figure 5:
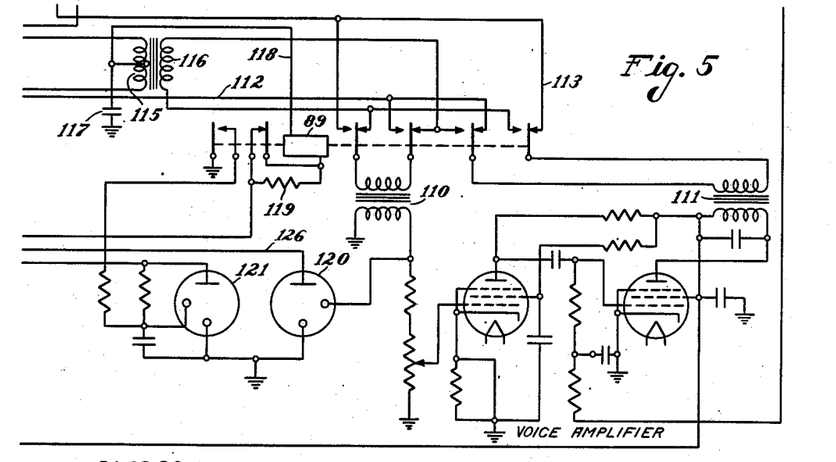
Fig. 5 is placed below Fig. 3, diagrammatically represent a preferred form of the system of this invention.

Since it is possible to determine at the central amplifier the polarity of the current flowing in the out-going voltage supply circuit which is called the primary wire, there is no need to use the parallel resistor R11 and capacitor C to prevent overlapping of the pulses into the next half cycle in the manner illustrated in Fig. 11a. In other words, the placement of the secondary circuit pulse in the first or last half of the cycle has no significance in the preferred circuit arrangement since the polarity of the primary current is known at the central amplifier to be referred to.

By the single operation of four different station selector keys, it is possible to set up eight different circuit connections at each station which uses all of the possible combinations of the three switches each having two operated positions.

Figure 17:
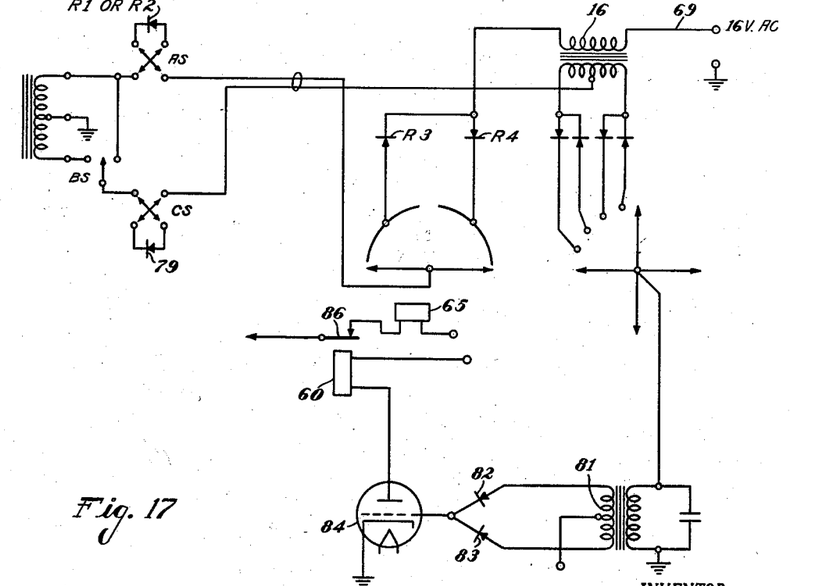
Fig. 17 is a simplified diagram of the pulse selection circuit employed in the present system, to select and seize the wanted telephone station.

In Fig. 17 there is illustrated a greatly simplified showing which is the equivalent of the pulse selection circuits whereby any one of eight wanted stations can be seized. In this showing, the switches As and Cs serve to reverse the connections to the rectifiers at the calling station. Switch Bs is a single pole double throw phase reversing switch. The operation of these switches into any one of their eight possible combinations, simulates the operation of the station selecting keys at any given station to select any one of the eight stations.

To resume the detailed description of extending the connection to the called station, the operating circuit for the connector switch extends from the 50 volt source of current through the self-interrupting contacts and winding of the stepping magnet 65', back contact 66 and armature of the connector-stop relay 60, front contact and armature of the cut-through relay 38 to ground. It will be noted that two of the four banks of the connector switch, namely, the banks engaged respectively by the secondary wiper 61 and the primary wiper 62 are connected in multiple to similar banks at the finder switch which are engaged by the secondary wiper 36 and the primary wiper 53. By this arrangement the connector switch can be connected to the station selecting circuit in the same manner that the finder switch was operated in finding the calling station. Each of the eight fixed contacts respectively engaged by the secondary wiper 61 and by the primary wiper 62 of the connector switch corresponds or matches one of the eight station selecting combinations at each of the stations of the system. As the connector switch advances its wipers 61, 62, 63 and 64 over the active contacts at each bank of the switch, no current flows in the secondary circuit until the switch wipers encounter fixed contacts corresponding to the wanted station. At that time current flows in a circuit from ground, primary winding 69' of the pulse load transformer, secondary pulse wiper 64, fixed contact 68, rectifier 65, right hand portions of the transformer winding, conductor 69, back contact and armature of the connector-stop relay 60, back contact 70 and armature of the changeover relay 73, front contact and armature of the relay 38, conductor 37, wiper 36, contact 123, conductor S, winding 77 of the loud speaker, conductor 78, rectifier 79, through the selecting switch 10 in its lower position, conductor 80, winding of the pulse transformer PT and thence over the conductor C, to ground. The current in this circuit, consisting of ½ wave pulse, induces current in the secondary winding 81 of the pulse load transformer and thence through one or the other of the rectifiers 82 and 83 to the control grid of the "Thyratron" 84. The positive pulse thus induced is applied to the control grid of the "Thyratron" to fire this tube and thereby complete a circuit for energizing the connector-stop relay 60. This circuit extends from ground through the "Thyratron," winding of the relay 60, its innermost armature 86 and back contact, conductor 84, lower armature and front contact of relay 38, conductor 89', filter F through the rectifier elements 90, secondary winding of the power transformer, to ground. When the connector-stop relay 60 operates, it interrupts at its contact 66 and armature, the stepping circuit of the magnet 65 causing the connector switch to stop with its wipers 61, 62, 63 and 64 on the set of fixed contacts in the connector switch that are individual to the wanted station, STA 8. It should be pointed out that a preliminary operation of the break contact 86 on the relay 60 is provided in order to get faster operation of this relay and therefore stop the connector switch promptly. In order to obtain fast operation of the relay 60, it is provided with a low resistance coil which draws the maximum instantaneous current that the "Thyratron" can withstand. After the relay 60 has operated, the break contact 86 on this relay, introduces resistance in series with the winding of this relay which reduces the current to the relay, to some lower holding value.

It will be understood that there are both positive and negative pulses flowing into the primary winding 69' of the pulse load transformer. The transformer and rectifiers 82 and 83 are therefore necessary to convert all the pulses into positive impulses since negative pulses will not operate the "Thyratron." It should be mentioned that the primary winding 69' of the pulse load transformer and the shunt capacitor 87 are tuned to the fundamental frequency of the pulses, which frequency is approximately 120 cycles per second. This resonant circuit excludes high frequency transients caused by the opening and closing of the inductive pulse circuit as the primary and secondary pulse wipers 63 and 64 step from one set of contacts to another. These transients may be higher in voltage than the 120 cycle pulses and would cause false operation of the "Thyratron."

The present system is arranged so that the calling and called lines are not automatically connected to the voice amplifier as soon as the connector switch finds the contacts of the called line. Instead, the selecting key 10 must be held operated during the time that the finder and connector switches are being operated but must be released before the calling and called lines are connected for conversation.

The time for releasing the selecting switch 10 is indicated by a tone signal in the loud speaker LS at the calling station. If the calling and called lines were automatically connected to the amplifier as soon as the connector switch had found the called station, the calling line would be connected to the talk-listen circuits. If the station selecting switch 10 had not been released, the load of the station selection circuit would or would not operate the talk-listen relay 89 depending on the polarity of the rectifier. Thus the operation of the talk-listen relay 89 would not be predictable and provision must, therefore, be made to complete connection to the voice amplifier only after the station selecting key 10 has been released.

The energization, as previously mentioned, of the connector stop relay 60 besides stopping the operation of the connector switch, serves to complete other circuits which transfer the calling station lines P and S from the selecting circuit to the circuit of changeover relay 73 and also to close a break point in the tone circuit. Since the connector switch has now stopped with its switch brushes in engagement with the set of contacts individual to the called line, a tone signal is now supplied to the speaker LS of the calling station to indicate that the calling party thereat can release the station selecting key 10 to effect the completion of the connection to the amplifier. It will be understood that the release of the station selecting key 10 before the receipt of such a tone signal could cause the connector switch to stop on a wrong line.

The tone signal is generated by a phase shift oscillator OSC, the output of which is connected or coupled to the input of a vacuum tube amplifier OSC AMP comprising one or more stages as desired. The plate supply is connected to the oscillator and to its amplifier through a contact on the finder cut-through relay 38 and through a contact on the changeover relay 73 in its normal position, and is disconnected from this supply by the operation of relay 73. This plate supply circuit extends from the plate of the oscillator and through the resistor 90 to the common point 91 and from the plate of the amplifier through the secondary winding 92 of the transformer to the common point 91, thence over conductor 94, back contact and armature 95 of the changeover relay 73, conductor 96, lower armature and front contact of the finder cut-through relay 38, conductor 89', through the rectifiers 90, to the 200 volt terminal of the secondary winding of the power transformer. The oscillator tone is supplied to the loud speaker of the calling station in a circuit extending from ground, secondary winding 98 of the pulse transformer, conductor 108, front contact and armature of the connector stop relay 60, contact 70 and armature of the changeover relay 73, front contact and armature of the finder cut-through relay 38, finder wiper 36 in engagement with a contact of a calling line, conductor S, through the winding of the loud speaker LS, conductor 78, rectifier 79, selecting switch 10 in its lower position, conductor 80, through the upper portion of the secondary winding of the pulse transformer, to ground over the conductor C. The loud speaker responds to this oscillating current and signals the calling party that he can now release the selecting key 10, to effect the operation of the changeover relay 73, which connects the calling and called stations to the voice amplifier. Since the loud speaker is also in series with the secondary pulse circuit, part of the signal energy is usefully consumed in the speaker and less of the signal energy is dissipated in the rectifier and in the pulse transformer. However, the rectifier does rectify the tone signal but this is only effective to alter the character of the resulting tone.

When the calling party releases the station selecting key 10, after hearing the tone signal, the changeover relay 73 is operated in a circuit extending from the 24 volt terminal of the power transformer, conductors 54 and 100, rectifier 101, lower winding of the changeover relay 73, rectifier 102, front contact and armature of the relay 60, conductor 103, through the connector contact 104, primary pulse wiper 63, conductor 105, back contact and armature of changeover relay 73, front contact and armature of relay 38, finder switch primary wiper 53, primary conductor P, thence through all the station selecting keys in their normal position, loud speaker LS, secondary conductor S, thence through the secondary wiper 36 of the finder, conductor 37, armature and front contact of the stop relay 38, armature and contact 70 of the changeover relay 73, armature and front contact of the connector stop relay 60, conductor 108 and thence through the winding 98 of the transformer, to ground. The changeover relay 73 is operated in this circuit and on operation, locks itself operated from ground, through its upper winding, its inner front contact and armature, through the upper front contact and armature of the relay 38, conductor 49 and thence through, the resistor 50' and rectifier 51, to the terminal of the secondary winding of the power transformer. On operation, the relay 73 also connects the wipers 36 and 53 of the finder to the primary winding 115 of the isolation transformer. The operation of the changeover relay 73 also disconnects the plate supply from the tone oscillator or generator and connects this supply to the audio amplifier generally designated AMP. This changeover relay connects the output of the amplifier, to the called line. In addition, voltage is supplied to the tube in a manual release circuit. It will be understood that this circuit releases the entire connection after the expiration of a given interval of time. However, if a talk-listen key is actuated before the termination of this period, the time interval will again be extended.

The voice amplifier, which may be of any one of several different forms, is herein illustrated as comprising a conventional two-stage, resistance coupled amplifier. This amplifier has an input transformer 110 and an output transformer 111 which are connected respectively to the normally closed contacts of the talk-listen relay 89 where the calling line is normally connected to the input transformer through the isolation transformer 116, and the called line is normally connected to the output transformer. This relay, however, when energized by the operation of the talk-listen key 14, at the calling station, reverses the output and input connections to the calling and called lines respectively so that the party at the called station can reply. It will be noted that the calling and called lines are electrically balanced similar to commercial telephone lines, for noise reduction. The release of the talk-listen key immediately releases relay 89 so that the calling line is again connected to the input and the called line to the output of the voice amplifier. It will be noted that the called line is connected directly over conductors 112 and 113, to the contacts of the talk-listen relay 89 whereas the calling line is connected to the primary winding 115 of an isolation transformer, the secondary winding 116 of which is connected to the normally closed contacts of this talk-listen relay. The mid-tap of the primary winding 115 of the isolation transformer is connected both to the winding of the talk-listen relay 89 and also to ground through capacitor 117. The operation of the talk-listen key at the calling station, energizes the talk-listen relay 89 in a circuit which is traceable from ground at that station, through both halves of center tapped resistor 107, through the conductors P and S in parallel, finder switch wipers 36 and 53, armatures and front contacts of the finder cut-through relay 38, armatures and front contacts of the changeover relay 73, primary winding 115 of the isolation transformer, through the mid-tap of this winding, through the conductor 118, winding of the talk-listen relay 89, armature and back contact of relay 89, resistor 50', rectifier 51, to the 50 volt terminal of the secondary winding of the power transformer. The talk-listen relay 89 when energized completes a holding circuit for itself through the protective resistor 119, to the 50 volt terminal of the power transformer, which circuit is independent of the armature and back contact of this relay. At the time that relay 89 is energized, the input transformer of the voice amplifier is connected to the armatures and front contact of relay 89 and thence over conductors 112 and 113, to the called station. At this time also, the output transformer of the amplifier is connected through the armatures and front contacts of the talk-listen relay 89 to the secondary winding 116 of the isolation transformer. Since the calling line is center tapped to ground at the calling station and is also center tapped to ground at the primary winding 115 of the isolation transformer, very little noise is introduced into the circuit due to the switching of the relay 89.

When the calling party desires to terminate the connection, the release key at the calling station is operated. This is effective to disconnect the S conductor of the calling line from the speaker LS and to connect it to the common ground wire C. The voltage charge on the capacitor on the center tap of the isolation transformer winding is connected to this S wire. The current resulting in the primary winding of the isolation transformer as a result of connecting the S wire to ground as just mentioned, produces a voltage surge in the secondary winding of the isolation transformer which surge is conducted through the input transformer and to the starter anode of the cold cathode tube 120. This surge voltage may be as high as 200 volts on the secondary winding of the input transformer. The anode of the cold cathode tube is connected to conductor 126, lower armature and front contact of relay 73, lower winding of the cut-through relay 38, lower armature and front contact of relay 38, conductor 89' through the inductance of the filter, rectifier 90 to the 200 volt terminal of the power transformer. The two windings of the relay 38 are connected in opposition so that when the last-described circuit is completed the two windings oppose each other and cause this relay to release. The release of the relay 38 restores all of the operated equipment to its normal condition in readiness for another call.

It has been mentioned that in the present system the equipment will be automatically released at the end of a predetermined interval of time, in the event that the talk-listen key is not operated before the expiration of this period. However, if this key is operated, the talking interval is extended for a further period. The automatic release of the connection at the end of the predetermined period is effected by a second cold cathode tube 121 which operates in parallel with the first-mentioned cold cathode tube. The anode supply voltage to the second cold cathode tube is applied through a contact on the cut-through relay. There is connected to the anode of this second cold cathode tube an RC timing circuit comprising the resistor and the capacitor. This timing circuit fires the second cold cathode tube at a predetermined time after the operation of the finder cut-through relay 38. When this cold cathode tube fires, it introduces opposing current at the second winding of the finder cut-through relay which is effective to release this relay as already described.

In the event that there is some circuit failure in the system following the operation of the finder cut-through relay 38 which failure would prevent completion of the call, the last-mentioned timing circuit is effective to release the system at the close of the predetermined time interval. Such a failure might arise when the "Thyratron" 84 tube burns out. Such a burn-out of the "Thyratron" tube would result in the connector switch continuing to hunt indefinitely since it is necessary for the Thyratron to operate in order to stop the hunting of the connector switch.

It will be noted that if the party at the calling station forgets to release the system manually at the close of the conversation, the automatic release arrangement just described is effective automatically to restore the system for use by another party.

The present system is so arranged that if a party at a calling station inadvertently calls his own line, the operation of the changeover relay connects the input and output of the voice amplifier to the calling line. This direct connection of the output of the amplifier to the input thereof causes a feed-back voltage at the input which fires the manual release cold cathode tube and releases the system. The gain of the voice amplifier is such as to produce sufficient feed-back to fire the cold cathode tube at the lowest gain setting of the amplifier.

The arrangement of the finder start circuit and the necessity of a practical arrangement of the other circuit, make it necessary that the 200 volt supply circuit be grounded. The common ground is connected to all speaker stations and is also connected during installation to the commercial power supply ground to afford shock and lightning protection. For this reason it is necessary to use an isolated transformer winding for the B supply instead of following the present trend toward the use of voltage doublers which have direct connection to the 115 volt power line.

Except for the six and three-tenths volt heater supply and the isolated 70 volt finder starting circuit winding, the other voltages are taken from a tapped 200 volt winding of the power transformer.

What I claim is:

1. In an intercommunicating telephone system, a plurality of telephone stations each including at least one rectifier, a telephone line comprising a primary conductor and a secondary conductor for each station, finder switching means including operating mechanism therefor and connectible to the conductors of a telephone line on the initiation of a call thereon, a start relay for initiating the operation of the operating mechanism of said switching means, means including the discharge tube and the rectifier individual to a line for operating said starting relay, a stop relay for stopping said switching means in communication with the conductors of the calling line, and a circuit for energizing the stop relay including the rectifier of the calling line.

2. In a selective switching system, a plurality of telephone stations each including at least one rectifier, a telephone line comprising a primary conductor and a secondary conductor extending from each station, finder switching means including operating mechanism therefor and connectible to the conductors of a calling telephone line on the initiation of a call at the station thereon, a start relay for initiating the operation of the operating mechanism of said switching means, and means including the discharge tube and the rectifier individual to a calling line for operating said start relay, means for continuing the operation of said switching means until said calling telephone line is found, and means then effective to stop said switching means.

3. In an intercommunicating telephone system, a plurality of telephone lines each including a primary conductor and a rectifier, a glow lamp individual to each telephone line, means including a primary conductor and an alternating current source for normally energizing the glow lamps of said telephone lines, a normally balanced vacuum tube bridge common to said telephone lines, a start relay operated in response to the unbalance of said bridge, a circuit including a calling telephone line operative on the initiation of a call thereover for disturbing the balance of said bridge whereby said relay becomes energized, said circuit including a glow lamp and the rectifier of the calling line, finder switching means for finding a calling telephone line, means including said start relay for initiating the operation of the switching means, means for continuing the operation of the switching means, a stop relay for stopping said last mentioned switching means in engagement with the terminals of the calling line, and means including said rectifier at the calling line for energizing the said stop relay.

4. In an intercommunicating telephone system, a plurality of telephone lines including a primary conductor, a rectifier and a glow lamp individual to each telephone line, means including a primary conductor of a telephone line and an alternating current source for normally energizing the glow lamps of said telephone lines, a normally balanced vacuum tube bridge common to said telephone lines, a start relay operated in response to the unbalance of said bridge, a circuit including a calling telephone line completed on the initiation of a call thereover for disturbing the balance of said bridge whereby said relay becomes energized, said circuit including a glow lamp and the rectifier of the calling telephone line, finder switching means for finding a telephone line on the initiation of a call thereon, means including said start relay for initiating the operation of the switching means, means for continuing the operation of the switching means, a stop relay for stopping said last mentioned switching means in engagement with the terminals of the calling line, means including the rectifier at the calling line for energizing the said stop relay, connector switching means for extending the calling telephone line to a called telephone line, and a cut-through relay energized by the stop relay for disconnecting the finder switching means from the calling line and for connecting the connector switching means thereto.

5. In a telephone system, a plurality of telephone stations, each station being provided with a set of operable key contacts, one set being assigned to each of the other stations of the system, means including a finder switching means and a connector switching means and operating mechanism therefor located at a remote point, a telephone line extending from each station to said switching means, means responsive to the operation at a calling station of a set of contacts assigned to a wanted station for actuating one of said mechanisms to cause the finder switching means to find the telephone line of the calling station and means including said operated set of contacts at the calling telephone station for another of said mechanisms to cause the connector switching means to complete the connection of the calling station telephone line to the telephone of the wanted station.

References Cited in the file of this patent

UNITED STATES PATENTS

| Number | Name | Date |
|---|---|---|
| 2,172,579 | Heron | Sept. 12, 1939 |
| 2,278,410 | Bascom | Apr. 7, 1942 |
| 2,302,334 | Logan | Nov. 17, 1942 |
| 2,502,415 | Bary | Apr. 14, 1950 |